Oct. 6, 1942.                L. A. KILGORE                2,298,133
              SYNCHRONOUS MOTOR STARTING SCHEME
                    Filed July 27, 1940        2 Sheets-Sheet 1

WITNESSES:                              INVENTOR
E. F. Oberheim.                         Lee A. Kilgore.
Leon J. Faza.                        BY Paul E. Friedemann
                                          ATTORNEY

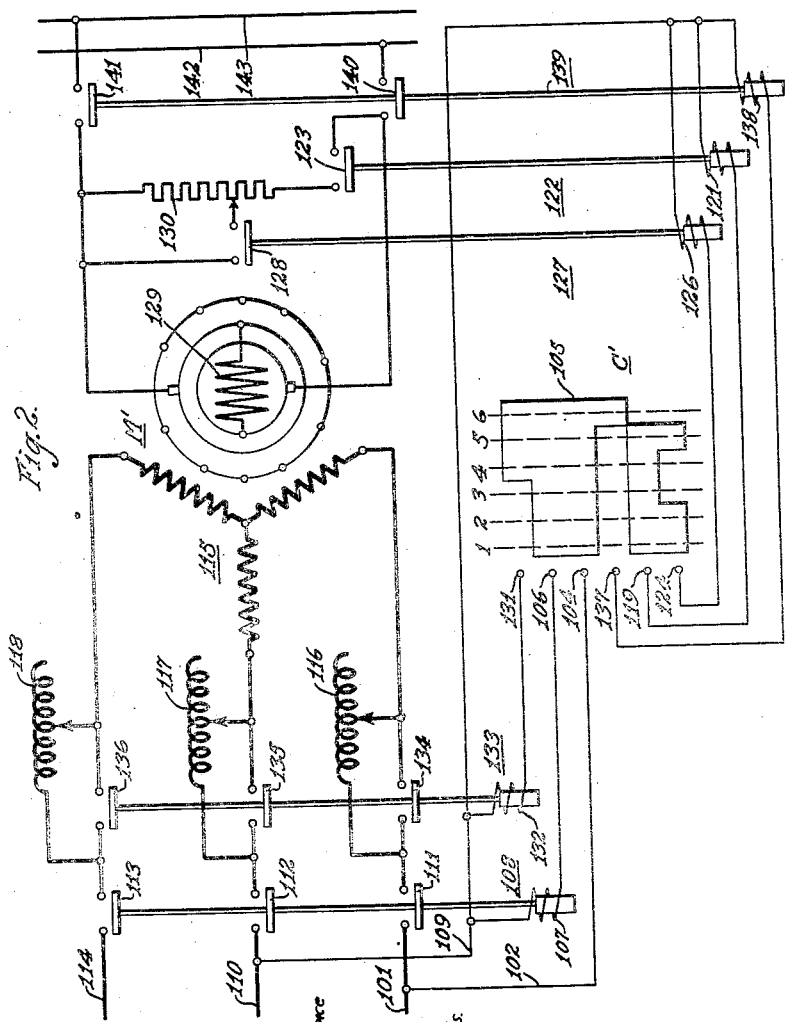

Patented Oct. 6, 1942

2,298,133

UNITED STATES PATENT OFFICE 2,298,133

SYNCHRONOUS MOTOR STARTING SCHEME

Lee A. Kilgore, Forest Hills, Pa., assignor to Westinghouse Electric & Manufacturing Company, East Pittsburgh, Pa., a corporation of Pennsylvania Application July 27, 1940, Serial No. 347,904

5 Claims. (Cl. 172—289)

My invention relates to systems of control for alternating current motors and, more particularly, to systems for controlling the starting of synchronous motors.

Many workers in the field have provided systems for controlling the starting of synchronous motors but none of the known systems provide the flexibility, efficiency and reliability of control, particularly where a given load torque requirement might subject the supply system to surges not permitted.

One broad object of my invention is to combine armature control and field control during the starting cycle of a synchronous induction motor.

A more specific object of my invention is the provision of alternate effective voltage control on the primary winding and control for the field winding of a synchronous induction motor, which control for the armature may include variation of the effective voltage by reactors, resistors, autotransformers, or various arrangements of the connection of the windings of the armature, as changes from series star to series delta, or to parallel delta, or other combinations of these, and which control for the field winding may include varying the impedance of the discharge circuit of the field, in one or more steps, or changing the number of poles, or both.

Other objects and advantages will become more apparent from a study of the description as it proceeds and a study of the accompanying drawings, in which:

Fig. 2 is a diagrammatic showing of a modification of my invention; and

Fig. 3 is a graphic showing of the novel results obtained with my control systems.

Figure 1:
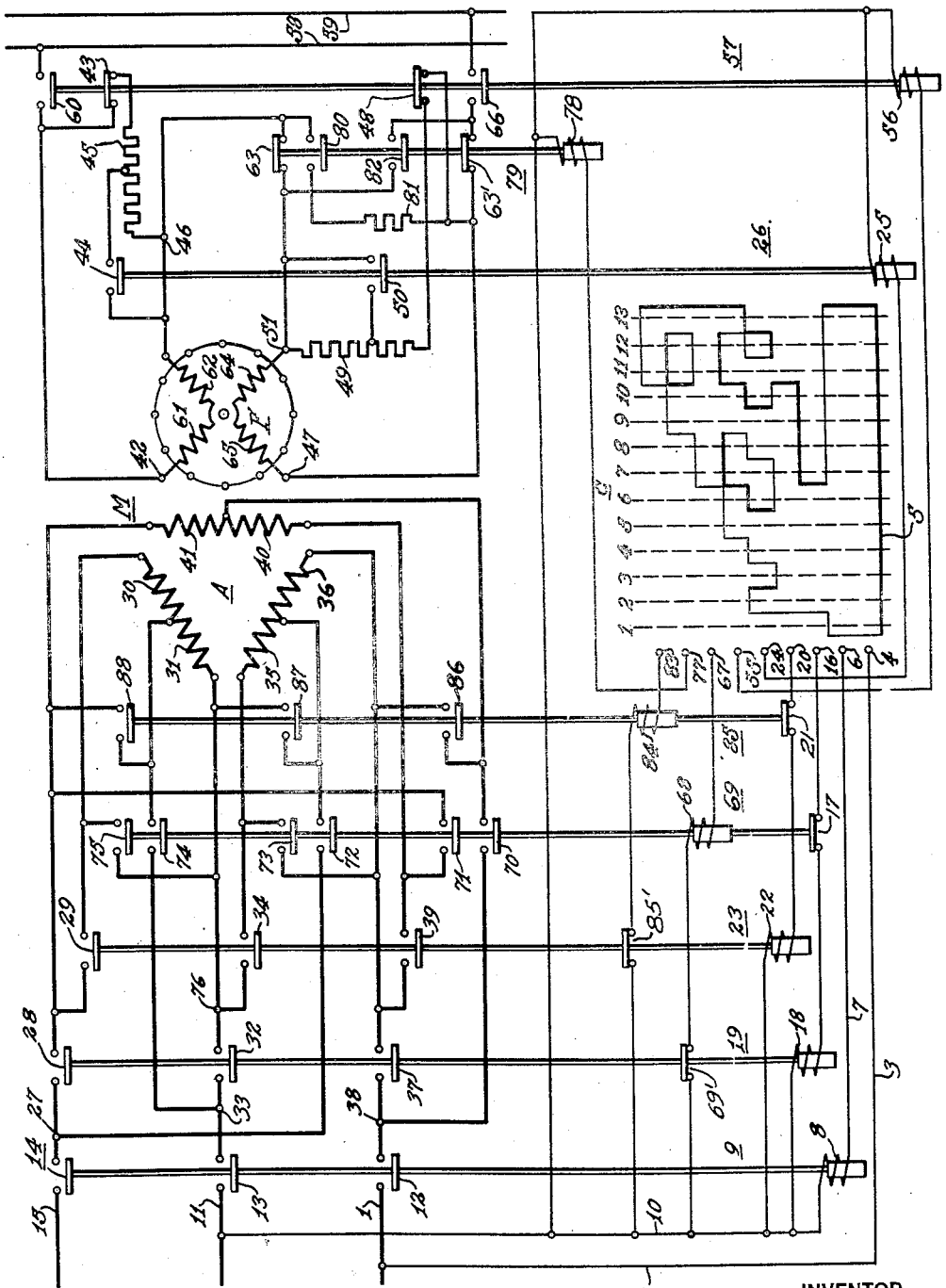
Figure 1 is a diagrammatic showing of my starting control system as applied to a two-speed synchronous induction motor.

In Fig. 1, M designates generally the motor to be controlled. The armature windings A comprise a plurality of sections 30, 31, 35, 36, 40 and 41, and the field windings F a plurality of poles 61, 62, 63 and 65 for operation at two or more speeds. I have chosen the simplest two-speed motor merely to simplify the description but it is apparent to those skilled in the art that many more than four poles may be used and are usually used.

The controller C is shown as of the drum type operated at a constant speed by a suitable constant speed motor (not shown). By operating the controller at constant speed all the starting steps are properly timed. I may, of course, use electromagnetic control and inductive timing, or field frequency type timing, to get the desired sequence of operation but the discussion is probably simpler with the use of a drum controller.

The various contactors for effecting the steps in the starting cycle are designated.

A better understanding can probably be had from a study of a typical starting cycle. Assuming the buses 1, 11 and 15 are energized and the attendant operates the controller to the first starting position, a circuit is thereby established from bus 1, through conductors 2 and 3, contact fingers 4 and 6, bridged by controller segment 5, conductor 7, actuation coil 8 of the main line contactor 9 and conductor 10 to bus 11.

Operation of contactor 9 closes contact members 12, 13 and 14 connecting buses 1, 11 and 15 so that the various armature circuits, to be presently described, may be made.

Upon movement of the controller to the second position, a circuit is established from the energized segment 5 through contact finger 16, through closed contact members 17, actuating coil 18 of contactor 19 to energized conductor 10. A circuit is also established from segment 5 through contact finger 20, closed contact members 21, actuating coil 22 of contactor 23, to energized conductor 10. A further circuit is established from segment 5 through contact finger 24, and actuating coil 25 of contactor 26.

By operation of contactors 19, 23 and 26, a series delta connection for the armature windings A is established, and a low resistance discharge circuit is established for the field windings F.

The series delta circuit may be traced from junction 27, through contact members 28 and 29, windings 30 and 31, contact members 32, junction 33, contact members 32 and 34, windings 35 and 36, contact members 37, junction 38, contact members 37 and 39, windings 40 and 41, contact members 28 back to junction 27.

The field windings on the other hand, though including a plurality of poles, are connected, in effect, as two single-phase low-resistance circuits. These circuits may be traced, for one, from slip ring 42 through contact members 43, a relatively small portion of discharge resistor 45, contact members 44 to slip ring 46, and, for the other, from slip ring 47, contact members 48, a relatively small portion of resistor 49 and contact members 50 to slip ring 51.

This second starting step makes the field discharge resistance low. This is of advantage to protect the field winding against excessive voltage. This step may, however, not be necessary when the motor design and supply voltage selected are such as not to produce excessive field voltage.

The third step of the controller merely opens the circuit for coil 25 at contact finger 24, thereby placing the entire resistors 45 and 49 in the respective two discharge circuits of the field windings, and the fourth step effects the reclosing of contact members 44 and 50. The torque variations for these last three steps are illustrated by curve portions 52, 53 and 54 shown in Fig. 3.

At the end of the fourth step, contact finger 55 is energized, thus establishing a circuit for coil 56 of the contactor 57, thereby energizing the field F with direct current from the source 58 and 59. The circuit may be traced from energized conductor 58 through contact members 60, pole windings 61 and 62, contact members 63, pole windings 64 and 65, contact members 63' and 66 to energized conductor 59.

It will be noted that the field is connected for four pole or slow motor speed operation, and also that the discharge resistors are disconnected from the field windings right after excitation of the field.

After operation on the four poles as long as desired, contact fingers 67 are energized and contact fingers 16 are deenergized. This effects the transfer from series delta to parallel star connection. During this transfer, contact finger 24 is, of course, also deenergized so as to start this induction motor cycle of operation on high resistance of the field, since contact members 44 and 50 will thus be opened.

When contact finger 67 is energized, a circuit is established for coil 68 of contactor 69 through contact members 69', and contact members 70 to 75, inclusive, are closed. The parallel star circuit is thus established. This circuit may be traced from junction 27, through contact members 72, armature sections 35 and 36 in parallel to the junction 76. The circuit from section 35 to junction 76 is through contact members 34, whereas the circuit for the right-hand end of 36 is through contact members 73 and 34.

For the armature sections 40 and 41, the circuit is from junction 38 through contact members 70 and then sections 40 and 41 in parallel to junction 76. The circuit for section 40 may be completed through contact members 39, 73 and 34 to junction 76, whereas the circuit for section 41 is completed through contact members 29, 75 to junction 76.

For the armature sections 30 and 31, the circuit is from junction 33 through contact members 74 and then sections 30 and 31 in parallel to junction 76. The circuit for section 30 is completed through contact members 75 to junction 76, whereas the circuit for section 31 is direct to junction 76.

In the eighth controller position, finger 24 is again energized. This means that the field discharge resistance is changed from high resistance to low resistance.

In the ninth position, finger 55 is again energized. This means the field is again energized with direct current, but in this position contact finger 77 is also energized. A circuit is thus established for coil 78 of contactor 79. This contactor connects the field for two pole or high speed operation.

The two-pole circuit may be traced from energized conductor 58 through contact members 60, windings 61 and 62, contact members 80, resistor 81, windings 65 and 64, contact members 82 and 66 to energized conductor 59.

Note that the connections for windings or poles 65 and 64 are reversed, thus making poles 61 and 65 alike and poles 62 and 64 alike.

After the motor has synchronized, namely, is at 100% speed, the field is again removed and before the motor has a chance to drop in speed any considerable extent the armature is transferred from parallel star to parallel delta. It is a distinct advantage to make this transfer from synchronous speed to, say, 95% speed than from 95% speed to 90% speed if this transfer were attempted from parallel star to parallel delta without the two-pole synchronization.

The parallel delta armature connection is effected at the eleventh controller step, when finger 83 is energized. In this position coil 84 of contactor 85 is energized through closed contact members 85', and contact members 86, 87 and 88 are closed. The parallel delta circuit is thus established.

This circuit may be traced from junction 27 through contact members 72, thence through winding 35, contact members 73 and 37 to junction 38 and a parallel circuit through winding 36 and contact members 37 to junction 38. A second side of the delta connection is from junction 38, contact members 70, winding 40, contact members 71, 88 and 74 to junction 33 and a parallel circuit through winding 41 and contact members 88 and 74 to junction 33. The third side of the delta connection is from junction 33 through contact members 74, winding 30, contact members 75, 87 and 72 to junction 27 and a parallel circuit through winding 31 and contact members 87 and 72 to junction 27.

The motor thus operates on parallel delta first with high field discharge resistance and then on low-resistance since contact finger 24 is energized in the twelfth controller position.

In the thirteenth position, finger 55 is energized and as a consequence the motor is synchronized on two poles or high speed operation.

In Fig. 3, curves 52, 53, 54, etc., illustrate the various torque variations and also illustrate how the toque curves can be made to closely follow the load torque curve without causing excessive surges.

The modification shown in Fig. 2 illustrates a system in which the effective voltage of the primary winding of a synchronous motor is varied by means of reactors and a plurality of values of resistance are utilized in the field circuit of the synchronous motor to obtain the desired torque characteristic.

Assuming that the buses 101, 110 and 114 are energized from a source of power (not shown) and that the controller C' is operated to the first starting position, a circuit is thereby established from bus 101, through conductor 102, contact fingers 104 and 106, bridged by controller segment 105, actuation coil 107 of the main line contactor 108 and conductor 109 to bus 110.

Operation of contactor 109 closes contact members 111, 112 and 113 connecting busses 101, 110 and 114 to the primary windings 115 of the synchronous motor M' through the starting reactors 116, 117 and 118.

Another circuit is established in the first position of controller C' from the energized contact finger 104 through controller segment 105, contact finger 119, actuation coil 121 of contactor 122 and conductor 109 to bus 110. Operation of contactor 122 closes contact members 123.

A further circuit is established in the first position of controller C' from the energized contact finger 104 through controller segment 105, contact finger 124, actuation coil 126 of contactor 127, and conductor 109 to bus 110. Operation of contactor 126 closes contact members 128.

By operation of contactors 122 and 127, the field winding 129 of motor M' is connected through a relatively small portion of resistor 130 to thereby keep the field voltage to a minimum. It will readily be understood that resistor 130 may be a field discharge resistor or a starting resistor.

After the controller C' has been advanced through a plurality of positions, for example, two, to allow sufficient time for the motor to reach as high a speed as can be attained with this set of connections, the controller C' is then advanced to the third position. In the third position of the controller, segment 105 disengages contact finger 124 to open the circuit through coil 126 of contactor 127, thus causing contact members 128 shunting a portion of resistor 130 to open to thereby insert sufficient resistance in the circuit of field winding 129 to give high torque at this speed. It will readily be understood that by utilizing a plurality of contactors 127, selectable portions of resistor 130 may be inserted in the field circuit at will.

After the motor accelerates further, the controller C' is advanced to the fourth position when controller segment 105 completes the circuit for energized contact finger 104 through contact finger 131, operating coil 132 of contactor 133 and conductor 109 to bus 110.

Operation of contactor 133 closes contact members 134, 135 and 136, thereby shunting the reactors 116, 117 and 118, respectively, and connecting the primary windings 115 to the buses 101, 110 and 114.

After allowing the motor to accelerate to a higher speed, controller C' is advanced to position 5 when contact finger 124 is again energized, thus reclosing the circuit of field winding 129 through contact members 128 to give a low resistance suitable to give maximum torque at low slip.

In the sixth position of controller C', segment 105 bridges contact fingers 104 and 137 to complete the circuit for energizing operating coil 138 of contactor 139. Operation of contactor 139 causes contact members 140 and 141 to close, thereby energizing field 129 with direct current from the sources 142 and 143, causing the motor M' to pull into step and operate at synchronous speed.

Also in the sixth position of controller C', segment 105 disengages contact fingers 119 and 124, thereby deenergizing operating coils 121 and 126, thus opening the circuit through resistor 130.

It will readily be understood that the reactors 116, 117 and 118 may be shunted in more than one step by utilizing additional contactors 133 each shunting a portion of the reactors. Furthermore, it will be understood that reactors 116, 117 and 118 and contactor 133 may be omitted and the primary winding 115 may then be connected to the buses 101, 110 and 114 directly through contact members 111, 112 and 113. The sequence of operation will be the same as hereinabove described in connection with Fig. 2, except that the step corresponding to the fourth position on controller C' is omitted.

Another variation may be arranged by utilizing an auto-transformer to obtain reduced voltage on the primary windings 115 in a manner well known to those skilled in the art. It will be understood that the sequence of operation may be the same as that hereinabove described in connection with Fig. 2.

I am, of course, aware that others, particularly after having had the benefit of my teachings may device other circuit diagrams for accomplishing the same or similar novel results. I, therefore, do not wish to be limited to the particular system of control shown and described, but wish to be limited only by the scope of the claims hereto appended.

I claim as my invention:

1. In a system of control for a synchronous induction motor, in combination; a two-speed synchronous induction motor having armature windings comprising a plurality of sections that may be connected in series delta, parallel star and parallel delta, and field windings comprising a plurality of pole windings that may be connected for two speeds; a source of alternating current; a source of direct current; discharge resistors for the field windings; means for simultaneously connecting the armature windings in series delta, and connecting portions of the discharge resistor to the field windings; means for varying the resistance effect of the field discharge resistor; means for connecting the field winding for low speed operation to the source of direct current; means for transferring the armature winding from series delta to parallel star; and transferring the field to field discharge connection; means for varying the field discharge resistor resistance while the parallel star connection is maintained; means for connecting the field for high speed operation; means for transferring the high speed field connection to discharge circuit connection; and means operable immediately after the last named means for transferring the armature connection from parallel star to parallel delta; means for varying the resistance value of the field discharge resistor while the parallel delta armature connection is maintained; and means for opening the field discharge circuit and simultaneously energizing the field for high speed operation.

2. In a system of control for a synchronous induction motor, in combination, a synchronous induction motor having armature windings and field windings, and field discharge circuits, said field discharge circuits being designed to materially alter the starting torque characteristics during starting, if the resistance characteristics of the discharge circuits are varied; a source of alternating current, a source of direct current; means for connecting the armature winding to the source of alternating current, field excitation control means for connecting the field to the source of direct current; means for varying the effective voltage of the source of alternating current on the armature in a plurality of successive steps, means for varying the resistance characteristic of the field discharge circuits by a plurality of successive steps during each step of effective voltage variation, and means for causing operation of the field excitation control means to temporarily excite the field windings with direct current at the end of a set of steps varying the resistance characteristic of the field discharge circuits before the next step for varying the effective voltage of the source of alternating current is taken.

3. In a system of control for a synchronous induction motor, in combination, a two-speed synchronous induction motor having armature windings and field windings wound for several speeds and field discharge circuits, said field discharge circuits being designed to materially alter the starting torque characteristics during starting, if the resistance characteristics of the discharge circuits are varied; a source of alternating current, a source of direct current; means for connecting the armature winding to the source of alternating current; field excitation control means for connecting the field to the source of direct current for one speed of operation; means for varying the effective voltage of the source of alternating current on the armature in successive steps, and means for varying the resistance characteristic of the field discharge circuits during each step of effective voltage variation, and means for causing operation of the field excitation control means after a given variation of the resistance characteristic of the field discharge circuit to effect a different speed of operation.

4. In a system of control for a synchronous induction motor, in combination, a synchronous induction motor having armature windings and field windings, and field discharge circuits, said field discharge circuits being designed to materially alter the starting torque characteristics during starting, if the resistance characteristics of the discharge circuits are varied; a source of alternating current; a source of direct current; means for connecting the armature winding to the source of alternating current, field excitation control means for connecting the field to the source of direct current; means for varying the effective voltage of the source of alternating current on the armature in a plurality of successive steps, means controlling the field excitation control means for temporarily effecting energization of the field with direct current after certain steps other than the last step changing the effective voltage of the source of alternating current, and means for continuously exciting the field windings after the last step changing the effective voltage of the source of alternating current.

5. In a system of control for a synchronous induction motor, in combination, a two-speed synchronous induction motor having armature windings and field windings wound for several speeds and field discharge circuits, said field discharge circuits being designed to materially alter the starting torque characteristics during starting, if the resistance characteristics of the discharge circuits are varied; a source of alternating current, a source of direct current; means for connecting the armature winding to the source of alternating current; field excitation control means for connecting the field to the source of direct current for one speed of operation; means for varying the effective voltage of the source of alternating current on the armature in successive steps, means controlling the field excitation control means for effecting energization of the field with direct current after each effective voltage step, said last named means including means for changing the number of field poles after certain steps changing the effective voltage.

LEE A. KILGORE.